Patented Oct. 18, 1938

2,133,828

UNITED STATES PATENT OFFICE 2,133,828

METHOD OF BREAKING IN GEARS

Robert C. Moran, Wenonah, N. J., assignor to Socony-Vacuum Oil Company, Incorporated, New York, N. Y., a corporation of New York No Drawing. Application September 18, 1936, Serial No. 101,417

5 Claims. (Cl. 87—9)

This application is directed to a method of breaking in new gearing, particularly automotive rear end gears of the hypoid type and the like, which are subject to high unit bearing pressures at the tooth surfaces, for the purpose of establishing thereon highly polished rubbing faces without failure of the gear or damage due to excessive wear or to seizure, scuffing, scoring, and the like, during the break-in period. Gears of this type as initially installed are, of course, possessed of tooled surfaces, but these new gear tooth surfaces exhibit a very great degree of roughness as compared with the highly polished rubbing surfaces necessary for proper operation of the gears and which can be established only by proper breaking in of the gears. Frequent damage to gears during the break-in period is experienced on the one hand through seizure, scuffing, scoring, and the like when the lubricant used on the gears does not possess sufficient extreme pressure lubricating properties, and on the other hand through excessive wear and loss of metal when the lubricant used is too corrosive.

It is a principal object of this invention to provide a method of breaking in new gears which avoids both of the aforesaid objections. The term "new gears" as used herein means gears which have not yet been operated sufficiently so that they are worn in or broken in in the sense of having developed mutually interfitting smooth highly polished rubbing surfaces on the tooth surfaces.

The copending application of William L. Evers, Serial No. 56,450, filed December 28, 1935, assigned to the same assignee as this application, discloses the lubrication of gears which are subjected to extreme pressure conditions by using an appropriate petroleum lubricating oil containing a small percentage of an aryl phosphite, as for example triphenyl phosphite. This form of extreme pressure lubrication has proven to be very satisfactory for use after gears have been broken in. During the breaking in of new gears, however, this type of lubrication does not always prevent damage or failure where the new gears are subjected to exceptionally severe conditions. Increasing the proportion of the phosphorus compound in the lubricating oil in excess of the preferred proportion of about 2% does not have the effect of further improving the extreme pressure lubricating characteristics of the material and of preventing damage or failure of new gears under extremely severe conditions.

The copending application of Robert C. Moran and Everett W. Fuller, Serial No. 93,760 filed August 1, 1936, discloses the lubrication of gears which are subjected to extreme pressure conditions by using an appropriate petroleum lubricating oil containing a small percentage of a dixanthyl ethyl ether, as for example a diethyl dixanthyl ethyl ether. This form of extreme pressure lubrication has proven to be very satisfactory for use after gears have been broken in. During the breaking in of new gears, however, this type of lubricant does not always prevent damage or failure when the new gears are subjected to exceptionally severe conditions. Increasing the proportion of the dixanthyl ethyl ether in excess of about 5% does not have the effect of further improvement of the resulting lubricant to a degree sufficient to prevent damage and failure of new gears under exceptional "break-in" conditions.

This invention is based upon the discovery that new gears of the kind referred to herein may be broken in effectively by applying to the rubbing surfaces of the new gear teeth a lubricant which consists of a petroleum lubricating oil, an ester of an acid of trivalent phosphorus, and a dixanthyl ethyl ether. We have found that this method of lubrication satisfactorily protects new gears during the break-in period, even under extremely severe conditions, and does not cause objectionable wear or corrosion.

It is also an important feature that the break-in lubricant of this invention, while exceptionally effective for the breaking in of new gears, will not cause excessive corrosion and will not fail to lubricate, or otherwise damage the gears, if it is not removed from the gears promptly after they are broken in. This is important for the reason that such removal of the lubricant in automotive use cannot be relied upon because of difficulty in determining when the break-in period is over, failure of the car owner to make such change of lubricant due to forgetfulness, lack of knowledge of the necessity for so doing, etc. The lubricant used in the method of this application has the further property of blending satisfactorily with other extreme pressure lubricants commonly used, so that addition of other lubricant without removal of the break-in lubricant will not cause separation or other condition which prevents satisfactory lubrication.

The only conclusive test for operations of this character is that of testing the lubricant either under conditions of actual use or under conditions simulating the most rigorous use a new set of gears may encounter in going into service. This test must include high pressures rapidly applied at high rubbing speeds, as well as continuous operation at high load under high speed. To meet the test, the lubricant must allow the gear to pass through the test without scoring or scuffing. A convenient and representative test for such lubricants may be performed as follows: New, unused hypoid gear and pinion are set up in any one of several arrangements providing ability to apply known loads at known rates, either through the gear or through the pinion, coupled with revolution of the set at known speeds, the gear and pinion being bathed with the lubricant to be tested. The detailed procedure of test is as follows:

1. Adjust gear and pinion to final position while rotating at a comparatively low speed under a load of 900 pounds per linear inch of tooth. The gear is so arranged that the load is applied to the coast side of the tooth with the gear turning in a forward direction.

2. Under no load, raise speed until pinion is turning at 2500 R. P. M., this speed to be maintained during the following steps of the test.

3. Apply a load of 2700 pounds per linear inch of tooth, building it up uniformly across a period of one and one quarter minutes, and then operate under that load for a period of two hours.

4. Stop, and inspect gear and pinion without removing from setup or removing lubricant, performing inspection in as short a time as consistent with proper work, to prevent undue cooling of lubricant.

5. If gears are scored or scuffed, discontinue and report as failure.

6. If gears are not damaged, resume operation in same direction, at same speed, with same load built up in same manner as before, and operate for six hours.

7. Examine gears again, and if scored or scuffed, report as failure. This time allow set to stand long enough for lubricant to cool.

8. If gear set is still in good shape, resume test, applying the same load, at the same speed, the load built up in the same manner, this time to the drive side of the tooth, using the same oil bath without change, and continue operation for two hours.

9. Inspect, and if gear and pinion are undamaged by scuffing or scoring, the break-in lubricant has passed the test.

*Note.*—The loads are first applied to the coast side of the tooth, the gear being turned in the forward direction, because under such conditions, due to tooth curvature, and other reasons, scoring is more apt to be developed. In short, these conditions are the most severe.

A lubricant capable of passing this severe test may be used for breaking in gears under relatively severe conditions. Many lubricants perfectly competent to operate under the high pressures with a gear which has already been broken in are entirely incapable of withstanding such test, and are in fact not operative as breaking in lubricants. Most breaking in lubricants are too highly corrosive to permit of continued use. Many are prone to separation of constituents under conditions of storage or use. Some form sludges to a highly undesirable degree.

It has been found that the above test may be passed and that new gears may be broken in in a thoroughly satisfactory manner by using a lubricant compounded from a major portion of an oil of the nature of a cylinder stock, a small proportion of an ester of trivalent phosphorus, and a somewhat larger proportion of a dixanthyl ethyl ether. Specifically, this has been found to be the case using a lubricant composed of 100 parts of cylinder stock, 2 parts of triphenyl phosphite and 5 parts of diethyl xanthyl ethyl ether. The capabilities of this lubricant are unexpected. The same cylinder stock compounded with two parts per hundred of triphenyl phosphite did not enable the gear to endure the first two hours' application of load in the above test without serious scoring and scuffing, thus indicating failure of the lubricant for the purpose of breaking in new gears. Similarly, the same cylinder stock, compounded with 5 parts per hundred of diethyl xanthyl ethyl ether did not pass the first two hours' application of load, the gears being scored and scuffed. However, oils containing both constituents in approximately the proportions indicated above enabled the gears to endure the full test without indications of scoring, scuffing, or other difficulty due to failure of lubricant. The gears so lubricated were found, after completion of the test, to have highly polished rubbing faces of such character that they could thereafter be lubricated with ordinary extreme pressure lubricants; i. e., the gears were broken in. Additionally, it is found that the above lubricant is not possessed of highly corrosive properties, does not have to be removed promptly to avoid damage to the gears, and can be used in contact with other parts of the gear assembly, such as bronze fittings, and the like, which may be severely corroded by break-in lubricants customarily used.

The oil used is an oil of the nature of cylinder oil of the kind normally used in compounding good extreme pressure lubricants. The triphenyl phosphite may be used in proportions ranging from one part of triphenyl phosphite to about ten parts of triphenyl phosphite per one hundred parts of oil, although about two parts of this ingredient are ordinarily preferred, since amounts in excess of this amount are not possessed of increased properties in proportion to the increase in amount of the constituent used. In this connection it is interesting to note that amounts of this compound in excess of two parts when used alone with one hundred parts of oil are of substantially no more value when subjected to the above break-in test than is the compound containing only two parts of the ingredient. In place of this compound, the other esters of trivalent phosphorus may be used, including for example tricresyl phosphite and trioleyl phosphite. The diethyl xanthyl ethyl ether used was prepared by the method disclosed in the copending application of Moran and Fuller, above referred to. This compound may be used in the break-in lubricant composition in proportions of from about two to ten parts per one hundred parts of oil. Other dixanthyl ethyl ethers may be used, as for example ethyl ethers formed by reacting beta, beta dichlorethyl ether with sodium n-butyl xanthate, potassium phenyl ethyl xanthate, potassium methyl xanthate, potassium oleyl xanthate, potassium n-amyl xanthate, sodium n-propyl xanthate, and the like. The dixanthyl ethyl ethers do not possess the capacity, when used alone in oil, of forming satisfactory break-in lubricants.

From the foregoing it is clear that this invention resides in the discovery and provision of a novel method for breaking in new gears. The method is restricted to the breaking in of new gears, and no advantage over the above-mentioned copending applications of Evers, or of Moran and Fuller, is claimed in the operation of gears already broken in, and the method claimed herein does not comprise operation other than the break-in period. The break-in period is a period of exceptional requirements very different from normal operation after the gears are broken in. The solution of lubricating problems for this particular period is a separate field apart from normal lubrication after break-in. It is to this break-in problem that the present invention is directed and to which the claims are specifically limited.

I claim:

1. The method of breaking in new gears, such as hypoid gears and the like designed to develop extremely high contact pressures under high rubbing speeds and insufficiently polished for successful lubrication with hypoid gear lubricants of the usual degree of effectiveness, which comprises: operating said new gears in normal extreme pressure intermeshing relation while maintaining between the interengaged relatively moving gear surfaces a film of lubricating oil and simultaneously subjecting said gear surfaces to the combined chemical action of a dixanthyl ethyl ether and a tri aryl phosphite present as minor constituents in the lubricant film, thereby developing upon the gears contact surfaces capable of successful lubrication by hypoid gear lubricants of the usual degree of effectiveness.

2. The method of breaking in new gears, such as hypoid gears and the like designed to develop extremely high contact pressures under high rubbing speeds and insufficiently polished for successful lubrication with hypoid gear lubricants of the usual degree of effectiveness, which comprises: operating said new gears in normal extreme pressure intermeshing relation while maintaining between the interengaged relatively moving gear surfaces a film of lubricating oil and simultaneously subjecting said gear surfaces to the combined chemical action of a dixanthyl ethyl ether and a tri aryl phosphite present as minor constituents in the lubricant film, thereby developing upon the gears contact surfaces capable of successful lubrication by hypoid gear lubricants of the usual degree of effectiveness, said tri aryl phosphite being present in a relatively smaller amount than said dixanthyl ethyl ether.

3. The method of breaking in new gears, such as hypoid gears and the like designed to develop extremely high contact pressures under high rubbing speeds and insufficiently polished for successful lubrication with hypoid gear lubricants of the usual degree of effectiveness, which comprises: operating said new gears in normal extreme pressure intermeshing relation while maintaining between the interengaged relatively moving gear surfaces a film of lubricating oil and simultaneously subjecting said gear surfaces to the combined chemical action of a dixanthyl ethyl ether and a substance selected from the group consisting of tri phenyl phosphite, tri cresyl phosphite and tri oleyl phosphite present as minor constituents in the lubricant film, thereby developing upon the gears contact surfaces capable of successful lubrication by hypoid gear lubricants of the usual degree of effectiveness.

4. The method of breaking in new gears, such as hypoid gears and the like designed to develop extremely high contact pressures under high rubbing speeds and insufficiently polished for successful lubrication with hypoid gear lubricants of the usual degree of effectiveness, which comprises: operating said new gears in normal extreme pressure intermeshing relation while maintaining between the interengaged relatively moving gear surfaces a film of lubricating oil and simultaneously subjecting said gear surfaces to the combined chemical action of a dixanthyl ethyl ether and tri phenyl phosphite present in the lubricant film in the ratio of from two to ten parts of dixanthyl ethyl ether and from one to ten parts of tri phenyl phosphite to about one hundred parts of oil.

5. The method of breaking in new gears, such as hypoid gears and the like designed to develop extremely high contact pressures under high rubbing speeds and insufficiently polished for successful lubrication with hypoid gear lubricants of the usual degree of effectiveness, which comprises: operating said new gears in normal extreme pressure intermeshing relation while maintaining between the interengaged relatively moving gear surfaces a film of lubricating oil and simultaneously subjecting said gear surfaces to the combined chemical action of a dixanthyl ethyl ether and tri phenyl phosphite present in the lubricant film in the ratio of about five parts of dixanthyl ethyl ether and about two parts of tri phenyl phosphite in about one hundred parts of oil.

ROBERT C. MORAN.